J. W. POTTS & J. H. KEENE.
DISK SHARPENER.
APPLICATION FILED NOV. 16, 1912.

1,124,800.

Patented Jan. 12, 1915.
2 SHEETS—SHEET 1.

Inventors,
James W. Potts,
James H. Keene.
By Victor J. Evans,
Attorney.

Witnesses:

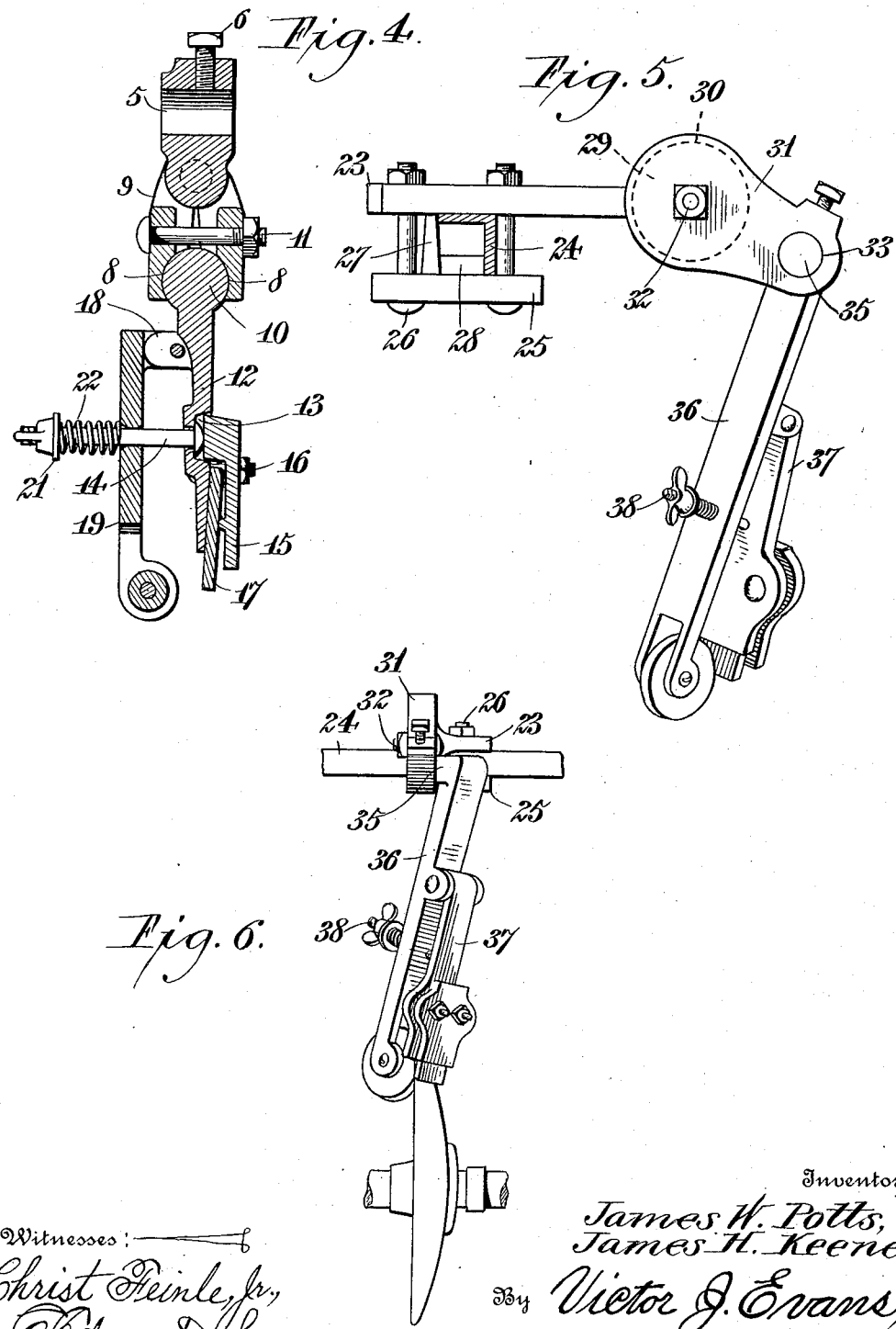

UNITED STATES PATENT OFFICE.

JAMES W. POTTS AND JAMES H. KEENE, OF ST. JOSEPH, MISSOURI.

DISK-SHARPENER.

1,124,800.  Specification of Letters Patent.  Patented Jan. 12, 1915.

Application filed November 16, 1912. Serial No. 731,778.

*To all whom it may concern:*

Be it known that we, JAMES W. POTTS and JAMES H. KEENE, citizens of the United States, residing at St. Joseph, in the county of Buchanan and State of Missouri, have invented new and useful Improvements in Disk-Sharpeners, of which the following is a specification.

This invention relates to disk sharpeners for harrows, cultivators and the like.

One of the principal objects of the invention is to provide a cheaply constructed attachment which may be readily applied to the frame of an ordinary harrow or cultivator and connected with any one of the disks in such manner that the disk will be sharpened during the operation of the machine.

Another object of the invention is the provision of a device of this character having its cutter blade and associated parts so arranged that they may be adjusted to accommodate the device for different sized disks, for different spacing of the disk and to produce different cutting belts.

Further objects of this invention will appear as the following specific description is read in connection with the accompanying drawings which form a part of this application, and in which:—

Figure 1:
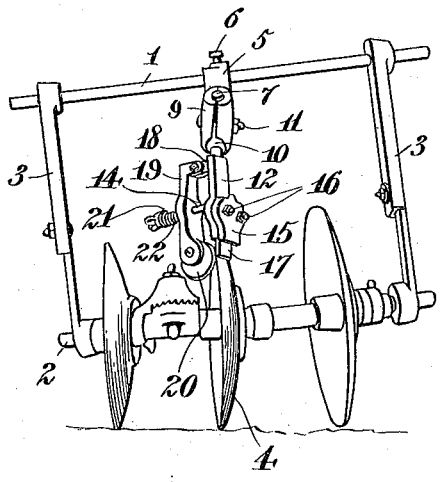
Figure 2:
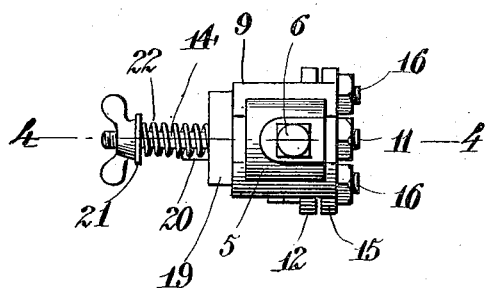
Figure 3:
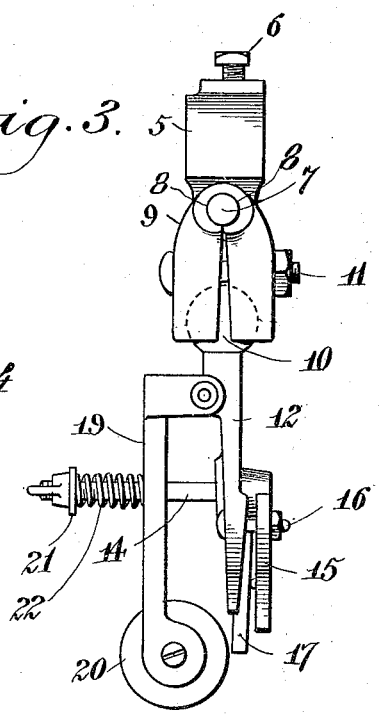

Figure 1 is a rear elevation of a disk cultivator showing the device applied thereto. Fig. 2 is a top plan view of the device. Fig. 3 is a side elevation. Fig. 4 is a longitudinal section on the line 4—4 of Fig. 2. Fig. 5 is a side elevation of a modification. Fig. 6 is a detail elevation of a portion of a harrow frame and one of the disks with the device shown in Fig. 5 mounted thereon.

Referring more particularly to the drawing 1 shows a portion of an ordinary disk harrow frame to which is connected the disk shaft 2 through the arms 3. This structure as illustrated is of a common form of disk harrow and the shaft 2, as usual, carries a plurality of disks 4. Slidably mounted upon the bar or frame 1 is a head 5 which is secured in adjusted position by a set screw 6 passing through the head and engaged with the ball 10. This head is provided with a pair of radially and oppositely extending studs 7 which are loosely engaged by the grooved ends 8 of the ball clamping or socket members 9. These socket members have suitable recesses in their ends to receive the ball 10 and are held together tightly over the ball and loosely around the lateral stud 7 by means of a bolt 11. The ball 10 is formed integrally with a cutter support 12 provided with a recess 13 in one face thereof to receive the head of an adjusting bolt 14 which passes through a member 12 as is shown in Fig. 4. The bolt 14 is held in position against displacement by the cutter clamping plate 15 secured to the member 12 by the bolts 16 and adapted to hold the cutter 17 between the plate 15 and the support 12. The support 12 is provided with a pair of laterally extending ears 18 to which is pivoted a roller supporting arm 19 carrying a roller 20 in its outer end, this arm is apertured as shown to permit the passage of the bolt 14 which has surrounding the same between the roller support 19 and a washer 21, a spiral spring 22. This spiral spring is normally adapted to hold the roller and cutter 17 in engagement with the disk 4, the roller being arranged at one side and the cutter being arranged at the opposite side at the proper angle to sharpen the disk as it is rotated by the progress of the machine. With this device it will be readily seen that any suitable vertical or lateral adjustment may be obtained and the cutter may be rotatably adjustable so as to secure the proper beveled cut on the edge of the disk.

In the modification shown in Figs. 5 and 6 a supporting arm 23 is secured to the frame bar 24 by means of the clip 25 and suitable bolts 26. The arm 23 is preferably longitudinally slotted so as to permit the passage of the bolts 26 whereby the arm may be adjusted transversely of the bar 24 as desired. The clip 26 is provided with a rib 27 and with an upstanding lug 28 the purpose of which is to engage opposite flanges of the bar 24 so as to prevent the arm from turning thereon. The outer end of the arm has secured thereto a suitably apertured post 29 which enters a socket 30 formed in an adjustable supporting arm 31, these parts being secured together by a bolt 32. The outer end of the arm has a lateral extending central apertured post 33 which is adapted to receive a lateral stud 35 formed on the wheel supporting arm 36, this wheel supporting arm has a cutter supporting member 37 pivoted thereto and the cutter supporting member is provided, as is usual, with an adjusting bolt 38 which passes through the wheel supporting arm 36. The joint at 33, 35 may be a ball and socket joint if so desired similar to that shown at 9 and 10.

What is claimed is:—

In a sharpening attachment for disks of disk harrows and the like, the combination with a supporting member, of a ball clamping member pivotally mounted thereon, a cutter support universally connected to said ball clamping member, a tension wheel pivoted to the cutter support, an adjusting bolt passing through the cutter support, means carried by the bolt for drawing the tension wheel toward the support and a cutter member held upon the support and adapted to prevent disengagement of the bolt.

In testimony whereof we affix our signatures in presence of two witnesses.

JAMES W. POTTS.
JAMES H. KEENE.

Witnesses:
 THOMAS LYON,
 JOB DARO.

Copies of this patent may be obtained for five cents each, by addressing the "Commissioner of Patents, Washington, D. C."